Feb. 4, 1947.     C. W. SAVITZ     2,415,221
WELL SURVEYING INSTRUMENT
Filed May 21, 1943     3 Sheets-Sheet 1

Inventor
Christian W. Savitz
by Earl Babcock.
Attorney

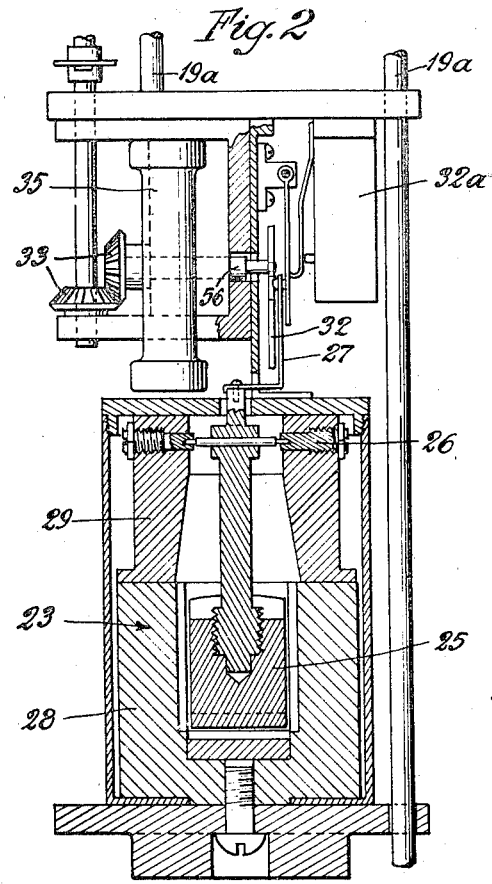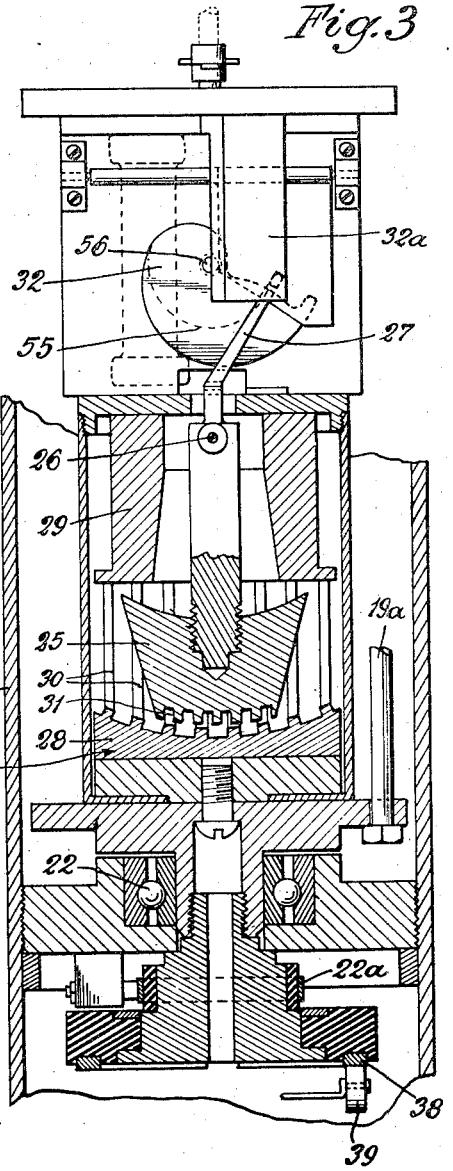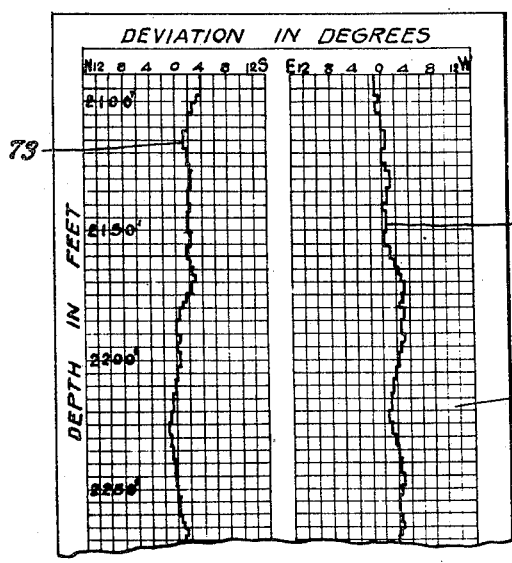

Feb. 4, 1947.    C. W. SAVITZ    2,415,221
WELL SURVEYING INSTRUMENT
Filed May 21, 1943    3 Sheets-Sheet 3
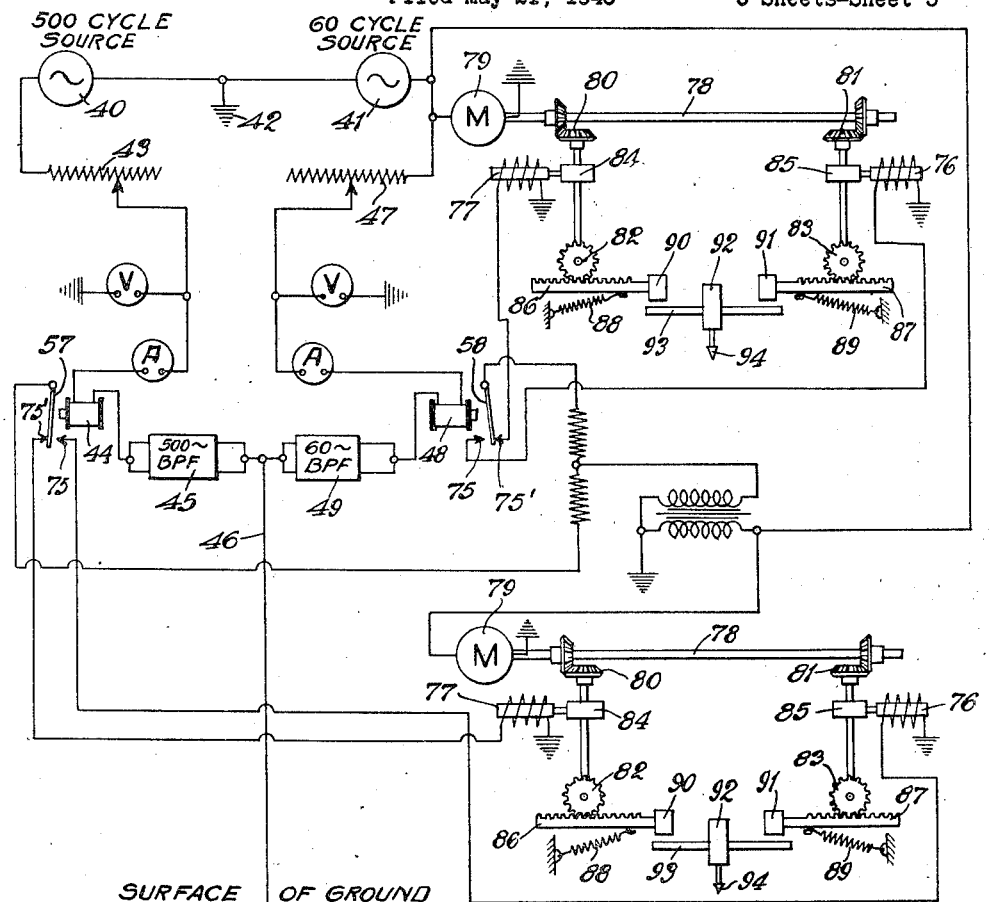
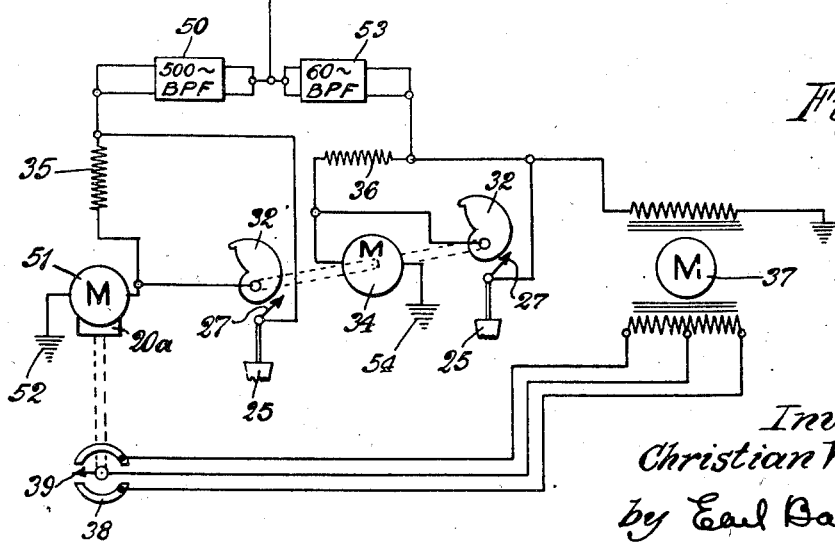
Fig. 5
Inventor
Christian W. Savitz
by Earl Babcock
Attorney.

Patented Feb. 4, 1947

2,415,221

UNITED STATES PATENT OFFICE 2,415,221

WELL SURVEYING INSTRUMENT

Christian W. Savitz, Glendale, Calif., assignor to Halliburton Oil Well Cementing Company, Duncan, Okla.

Application May 21, 1943, Serial No. 487,901

1 Claim. (Cl. 33—205.5)

1

This invention relates to devices for surveying angle and direction of inclination of a well bore and more particularly to devices for more or less continuously recording at the surface of a bore hole the angle and direction of inclination throughout the depth of the bore hole.

Heretofore, various devices have been suggested for indicating or recording the extent and direction of inclination of a bore hole at the surface while a device is lowered into the hole, the readings being taken or recorded as the device in the hole is successively lowered from one position to another.

It is common practice to run an "angle unit" in a well, this being the cylindrical body containing two pendulums mounted on axes at right angles to each other with a gyroscope maintaining the angle unit pointing in the desired direction. With such an arrangement pointers on the pendulums deviate from the longitudinal axes of the angle unit in known directions in proportion to the deviation of the well bore from the vertical. If the positions of the pointers are recorded at any instance, as by photography, a record is made of both the angle of deviation from the vertical and the direction of deviation at a particular depth.

It is an object of the present invention to make a continuous record, at the surface of the ground, of the deviation and direction of a well bore while the surveying tool is being run in the well.

It is a further object of the invention to devise a novel system in which the element of time is used to transmit intelligence from the surveying tool in the well to the recorder at the surface, the intelligence consisting of data as to the position of the two pendulums in the surveying tool both as to angular deviation and direction, the data being obtained simultaneously and repeatedly at successive depths and transmitted through a single conductor cable.

It is still another object of the invention to devise a novel electric circuit suitable for use in a well surveying tool in which one or more electric motors may be located in the surveying tool in the well bore and driven from a source of current at the surface and in which intelligence such as data relative to the position of one or more pendulums is transmitted telemetrically by modulation of the circuit to the motor for a time interval proportional to the deviation of the pointer from a given position.

Other objects and advantages reside in certain novel features of the arrangement and construction of parts, as will be apparent from the following description taken in connection with the accompanying drawings, in which:

Figure 2 is a view in vertical cross section of one of the pendulum devices employed in the angle unit of the apparatus of Figure 1;

Figure 3 is another vertical cross sectional view of one of the pendulum devices employed in the angle unit of Figure 1, this view being taken at right angles to that of Figure 2, and also illustrating the mounting for the lower end of the angle unit;

Figure 4 is a chart illustrating the type of record obtained in surveying a portion of a typical oil well; and Figure 5 is an electrical circuit diagram of the apparatus of Figure 1.

Figure 1:
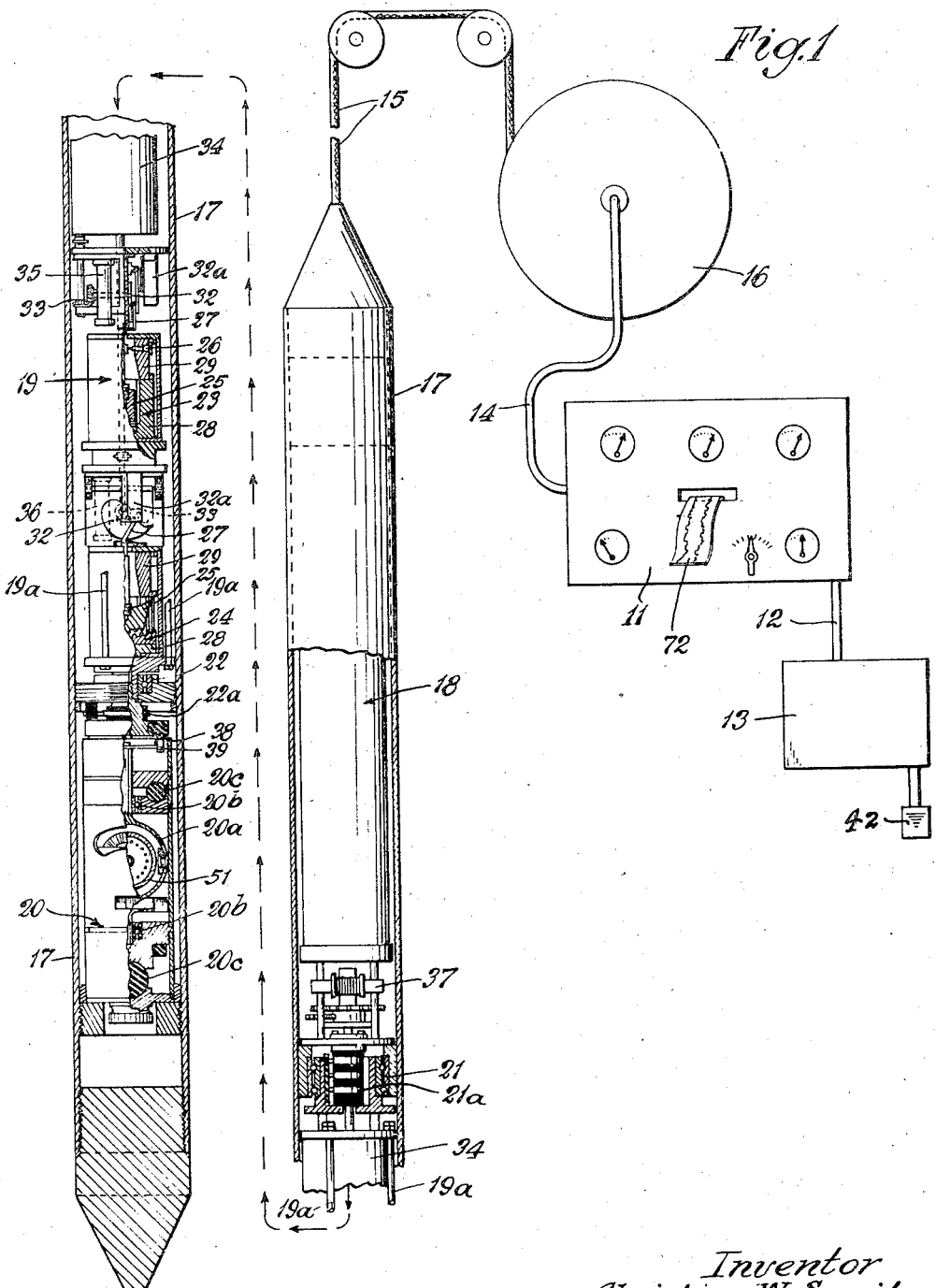
Figure 1 is a view in side elevation of apparatus constructed in accordance with the present invention, a portion of the device which is lowered into the well being cut away to illustrate the internal construction thereof.

Referring to the drawings in detail, it will be seen that the apparatus includes a container 11, in which electrical recording apparatus is mounted, the container 11 being connected by an electrical cable 12 to a container 13 in which two sources of electrical current are provided, one being a 500-cycle generator and the other being a 60-cycle generator. The container 11 is also connected by an electrical cable 14 to a single conductor cable 15 mounted upon a reel 16 which may be driven by some suitable source of power not shown in the drawings. The electrical cable 15 is connected to a device which may be lowered into an oil well or the like, the device having a cylindrical housing 17 within which three separate units are mounted. In the upper unit 18 there are two electrical filters. The intermediate unit 19 is called the angle unit and contains two pendulum devices such as are shown in Figures 2 and 3, together with additional apparatus forming a part of the system for indicating the positions of the pendulums at the surface of the well. The lower unit 20 is a gyroscopic directional control unit and contains a gyroscope and mechanism for holding the angle unit in the same position as the gyroscope or at a known angle with respect thereto, regardless of any angular movement of the case 17.

The electrical filters in the unit 18 are illustrated diagrammatically in Figure 5, and since their mechanical construction is of no particular importance, they will not be described structurally. The angle unit 19 is mounted within the case 17 on ball bearings 21 and 22. The unit includes two pendulum devices 23 and 24 which are mounted at right angles to each other. These devices are identical and are shown in detail in Figures 2 and 3. Each includes a pendulum 25 mounted on bearings 26. Above the bearings a pointer 27 is made integral with the pendulum to indicate the angular position thereof. Each pendulum 25 is mounted in a special housing consisting of a cup 28 filled with oil and a cover 29 which also serves to support the bearings 26. As shown in Figure 3, the interior of the cup 28 is fluted as illustrated at 30, while the lower portion of the pendulum body 25 is correspondingly fluted as illustrated at 31. These flutes together with the oil in the cup 28 serve to dampen the motion of the pendulum.

Adjacent the pointer 27 of each pendulum device, a cam 32 is mounted for continuous rotation during the time that the device is in operation. To drive the cams a suitable gear train is provided as illustrated at 33, which is driven by means of an electrical motor 34. This motor is a synchronous 60-cycle motor and is supplied by current from the 60-cycle source in the power supply container 13. It drives the cams at a constant speed even though there are variations in current or voltage in its circuit. The angle unit also contains two resistors 35 and 36, the purpose of which will be described later.

For convenience in description, the upper pendulum device 23 will be referred to as a north-south pendulum device, and the lower one designated 24 as an east-west pendulum device. Of course, the azimuth of the angle unit as a whole is a matter of choice, it being only necessary that the devices 23 and 24 be mounted in right angles to each other and that the direction of the axes of the two pendulum devices be known at the time when the survey at a given depth in the well is made in order to record the direction of deviation.

To insure the maintenance of the angle unit in a known azimuth the directional control unit 20 is provided. This unit includes a gyroscope 20a which functions as a compass and which may be set before the device is lowered into the hole, say at true north. The gyroscope is mounted on bearings 20b in the casing 17 through rubber shock balls 20c. The position of the gyroscope will be known throughout the movement of the device 17 in the well bore, assuming that corrections be made for drift in accordance with known practice in the use of gyroscope compasses.

To cause the angle unit to maintain exactly the same, or a known variation from the azimuth of the gyroscope, a shaded pole motor 37 is mounted in the top of the angle unit 19. The shade coils of this motor are connected to the two segments of a ring switch 38, the blade 39 of which is mechanically connected to the gyroscope so as to be held in a known azimuth thereby. The shaded pole motor 37 is supplied by 60-cycle current from the surface of the ground. The motor 37 and the switch mechanism 38—39 serve as a power relay for rotating the angle unit 19 in the case 17 in response to the angular position of the gyroscope.

Full details in the mechanical assembly need not be described here inasmuch as they will be obvious from the drawings to those skilled in the art. It might be mentioned, however, that the angle unit is assembled by tie-bolts 19a and that electrical power is transmitted through the bearings from one movable part of the assembly to another by the use of conventional brush and slip ring units such as are illustrated at 21a and 22a. It is also preferable to employ a microswitch such as illustrated at 32a in Figure 2, which is actuated through suitable mechanism by the pointer 27 and cam 32 rather than employing these parts themselves to make and break the electrical contact, but for simplicity in illustration, the switch 32a is not shown in Figure 5.

Referring to the electrical circuit diagram in Figure 5, it will be seen that a 500-cycle source of alternating electrical current is illustrated at 40, and a 60-cycle source of alternating current at 41, these two sources being incorporated in the container 13 of Figure 1. One side of each of these generators is grounded as illustrated at 42. The ungrounded terminal of the generator 40 is connected through a variable resistance 43 to the coil 44 of a relay which is in turn connected to a 500-cycle band-pass filter 45 which is connected to the conductor 46 of the cable 15 upon which the surveying tool is run into the well.

Similarly, the 60-cycle generator 41 is connected through a variable resistance 47 to a relay coil 48 which is in turn connected to a 60-cycle band-pass filter 49 connected to the conductor 46. Ammeters and voltmeters are preferably provided in these circuits as illustrated at A and V.

The circuits in the surveying tool 17 include a second 500-cycle band-pass filter 50, a modulating resistor 35 and the 500-cycle induction motor 51, which constitutes the gyroscope. One terminal of this motor 51 is grounded, as shown at 52. The gyroscope 20a controls the pointer 39 of the ring switch 38 connected to the coils of the shaded pole motor 37, the connections being as illustrated in Figure 5. The motor 37 remains motionless except when there is a tendency for the angle unit to deviate from the azimuth of the gyroscope, at which time the motor 37 acts to bring the angle unit back into line.

The other branch from the cable 46 in the surveying tool 17 includes a second 60-cycle band-pass filter 53, a modulating resistor 36 and the synchronous motor 34 which drives the cams 32. One terminal of the motor 34 is grounded as illustrated at 54. The cams 32 and the pointers 27 which rotate with the pendulums 25 are shown in this diagram, as constituting electrical switches. One of these switches is connected in parallel with each of the resistors 35 and 36. Thus when the left hand cam switch 27—32 in Figure 5 is closed, the resistor 35 is short circuited, and when the right hand cam switch shown in Figure 5 is closed the resistor 36 is short circuited. Short circuiting of the resistors 35 and 36 does not appreciably change the characteristics of the circuits in so far as the motors 51 and 34 are concerned, but does affect the amount of current flowing through the relay coils 44 and 48 at the surface of the ground. Hence, when either switch 27—32 is closed the corresponding relay coil at the surface of the ground is energized.

Referring to Figure 3, it will be seen that the length of time the switch 27—32 is closed depends upon the angular position of the pointer 27. In the position shown, the pointer 27 will make contact with the cam 32, during the interval of time it takes for the cam to rotate with the pointer traveling across it the distance shown by the dotted line 55. If the pointer 27 is closer to the axis 56 of the cam, it will remain in contact with the cam for a longer period of time. If the pointer 27 is farther from the axis 56 than is illustrated in Figure 3, it will remain in contact with the cam 32 a shorter period of time. It will thus be seen that the length of time the modulating resistors 35 and 36 are short circuited and hence the length of time that the relay coils 44 and 48 at the surface of the ground remain energized is dependent upon the angular position of the pointers 27 fixed to the pendulums 25.

Relay switches 57 and 58 are operated by coils 44 and 48. Due to the filters 45, 49, 50 and 53, the operation of the relay switch 57 will be dependent only upon the angular position of one pendulum in the surveying tool while the operation of the relay switch 58 will be dependent only upon the angular position of the other pendulum in the surveying tool.

It will be apparent from the above description that any mechanism which will indicate or record the length of time that the coils of the relay switches 57 and 58 remain energized during each cycle of rotation of the cams 32 will show the angular positions of the two pendulums in the surveying tool. One apparatus which is suitable for this purpose is the "Metameter" recording system of The Bristol Company of Waterbury, Connecticut, the essential features of which are shown and described in the United States Patent No. 2,040,918, granted to C. W. Bristol on May 19, 1936. Another kind of recording system is shown in Figure 5, which differs from that of the "Metameter" in some respects, but produces the same kind of record.

Since records of the positions of two pendulums are to be made, the recording apparatus may consist of two more or less separate units. In the drawings the two units are identical and the same reference characters are used on both.

It will be understood that the two pens or styluses which make the records on the tape are preferably arranged side by side, although they are not shown in this position in the circuit diagram of Figure 5. It will be assumed that the relay coil 48, when energized by the closing of the switch 27—32, responds to the position of the north-south pendulum in the surveying tool. When energized, it draws the blade 58 against its front contact 75 and when not energized, the blade 58 rests against the back contact 75'. Similarly, the relay coil 44, when energized in response to the closing of the switch 27—32 of the east-west pendulum draws the blade 57 against its front contact 75, the blade being at other times in engagement with the back contact 75'. The front contact 75 of each relay is connected to a solenoid 76, one terminal of which is grounded. The back contact 75' of each relay is connected to a solenoid 77, one terminal of which is grounded. The solenoids 76 and 77 control mechanical apparatus which records the relative lengths of time the switches 57 and 58 are in engagement with their respective front and back contacts. The apparatus includes a shaft 78, driven by a synchronous 60-cycle electric motor 79 connected to the 60-cycle source 41. Through suitable gear trains 80 and 81, power is intermittently transmitted from the continuously driven shaft 78 to pinions 82 and 83, the time the power is transmitted being under the control of clutches 84 and 85, operated by the solenoids 77 and 76. The pinions 82 and 83, drive racks 86 and 87, which are biased in an outward direction by springs 88 and 89. The inner ends of the racks 86 and 87 are provided with pushers 90 and 91 which move a collar 92, mounted with a slight amount of friction on a shaft 93. The friction collar 92 carries a pen or stylus 94 which makes a record upon a moving tape, not shown in Figure 5.

It will be seen that in the operation of the recording system just described the stylus 94 does not move horizontally until pushed in one direction or the other by the pushers 90 or 91. These pushers advance toward the friction collar 92 alternately, and the extent of the advance of either pusher is proportional to the time that the relay switch blade (57 or 58) is in engagement with the front or back contact 75 or 75'. Immediately upon the circuit to either solenoid 76 or 77 being broken, either spring 88 or 89 retracts the rack to which it is connected, back to its outer position.

Assuming that the cams 32 in the surveying tool are rotated at the speed of one revolution every five seconds, the racks 86 and 87 will each move once every five seconds, or twelve times a minute. If the cams are designed to be operated at the speed indicated the racks 86 and 87 should each be designed to move the maximum distance they are to push the stylus 94 in a five second interval of time. As an illustration, if it is assumed that the cam switch 27—32 at a given depth in the well is closed two seconds and opened three seconds out of its five second period of rotation, when it closes, the relay switch blade (57 or 58) will engage contact 75 for two seconds. This will energize solenoid 76 and engage the clutch 85, so that the pinion 83 will be rotated, advancing the rack 87. The rack 87 will push the stylus 94 two-fifths of the distance from its right hand position to its extreme left hand position. At the expiration of the two second period the clutch 85 will release and the rack 87 will be returned to its outward position by the spring 89. Upon the breaking of the circuit at the switch 27—32, at the end of the two second interval the switch blade (57 or 58) will engage its back contact 75', thus energizing the solenoid 77 and engaging the clutch 84 so that the pinion 82 drives the rack 86 toward the friction collar 92 and the stylus 94. The rack 86 will move to the right three-fifths of the total movement of the stylus 94, and in this case will not move the stylus.

Assuming that on the next rotation of the cam 32, the switch 27—32 remains closed less than two seconds, the stylus 94 will be unmoved by the advance of the rack 87, but will be moved to the right by the advance of the rack 86 in the latter part of the cycle.

Of course, a single motor 79 may be used to drive both charts, and in fact, the two charts may be made on the same strip of paper, as illustrated in Figure 4.

In Figure 4 a typical chart is shown at 72. Upon this chart there are two graphs, one at 73 illustrating the angular position of one of the pendulums 25, and the other illustrated at 74, illustrating the angular position of the other pendulum at various depths in the well.

On the chart, Figure 4, it will be noted that the stylus which drew the graphs 73 and 74 has moved horizontally at different depths measured linearly along the tape. The horizontal movements do not necessarily occur at uniformly spaced points longitudinally of the tape, however. This is due to the fact that the well surveying tool is not always moved in the well at a constant speed. The tape upon which the record is made should be driven in exact synchronism with the movement of the well surveying tool by means of suitable mechanism such as an "Auto-syn" drive, not shown in the drawings. As a result, the tape is not always moved at a uniform speed. The horizontal movements of the stylus occur at uniformly spaced intervals of time, so that if the surveying tool is slowed down temporarily the horizontal movements are recorded closer together on the chart than would be the case were the tool moving at its normal speed, say 50 feet per minute. In an instrument now constructed in accordance with the invention the cams are rotated 12 R. P. M. The surveying tool is designed to be moved at an average speed of 50 feet a minute in the well with the tape moving at an average speed of an inch a minute.

The operation of the apparatus is as follows:
The gyroscope is started and set in the desired azimuth say due north, and the time at which the apparatus is started into the well is noted. The time is important in order that correction due to drift of the gyroscope may be made as to the azimuth of the tool at any depth, after the survey is completed. As the surveying tool is lowered into the well, the cams 32 will be rotated continuously at a constant speed. By suitable means not shown, the depth of surveying tool in the well may be recorded on the chart 72. At each revolution of the cams 32, the angular position of the pendulums 25 at the given depth will be recorded on the chart through the mechanism described above. It will be seen that this operation may proceed both while the surveying tool is being lowered into the well and while it is being removed. After the surveying tool is removed from the well the time should again be noted so as to make the correction for drift. Inasmuch as the average well will probably be surveyed in a few hours, the entire drift will not be great and if a record is kept of the depth of the surveying tool in the well at short intervals of time, say every 15 minutes, no difficulty will be encountered in correcting the chart to within a fraction of a degree, even if the surveying tool is not run at a constant speed.

On one side of the tape means may be provided to make a mark on the tape every 10 feet for example. On the other side of the tape a time record may be made, making a mark (not shown in Figure 4), say every minute, this being desirable so that in the final computation for drift, an estimate can be made of the length of time the surveying tool has been in the well at any given depth.

The gyroscope may be so designed as to have an adjustment controlling the rate of drift. From experience it appears that the optimum drift should be about one degree every fifteen minutes. However, the drift will not remain exactly constant under one setting of this adjustment, inasmuch as it varies depending upon the angular position or tilting of the surveying tool in the well. In order to make an accurate drift check therefor, it is advisable to move the surveying tool slowly for a short period of time, say every 1,000 feet of survey, so that a reference point will appear on the chart.

While only one embodiment of the invention has been shown and described herein, it is obvious that various changes may be made in the arrangement and construction of parts without departing from the spirit of the invention or the scope of the annexed claim.

I claim:

In a device for surveying a well to determine the extent and direction of deviation from the vertical thereof, the combination of a surveying tool adapted to be lowered into the well, a single conductor electrical cable for lowering the tool into the well and electrical apparatus connected to the conductor of the cable for use at the surface of the ground including means to record intelligence transmitted from the tool in the well through the conductor of the cable, said surveying tool including an electrically driven gyroscope, an angle unit and means for holding the angle unit in a known azimuthal position with respect to the gyroscope, said angle unit having two pendulums therein arranged on axes at right angles to each other, two cams mounted for rotation adjacent said pendulums, a motor for rotating said cams, two resistors and two switches for selectively short-circuiting said resistors, and means for actuating said switches for periods of time proportional to the angular position of said pendulums with respect to the centers of rotation of said cams, said combination also including two sources of alternating current of different frequencies at the surface of the ground connected to the single conductor of the cable, means in the surveying tool including electrical filters, for selectively connecting the two sources to the electrically driven gyroscope and to the motor which drives the cams, said selective connecting means also including said resistors whereby modulation of the amount of current flowing through the cable from said sources is effected selectively in response to periodic short circuiting of said resistors by said switches, and electrical filters at the surface of the ground associated with said intelligence recording means for separating the effects of said modulation.

CHRISTIAN W. SAVITZ.

REFERENCES CITED

The following references are of record in the file of this patent:

UNITED STATES PATENTS

| Number | Name | Date |
|---|---|---|
| 2,317,632 | Miller | Apr. 27, 1943 |
| 2,190,950 | Potapenko | Feb. 20, 1940 |
| 1,404,580 | Choppinet | Jan. 24, 1922 |
| 2,309,905 | Irwin, et al. | Feb. 2, 1943 |
| 1,209,102 | Anschutz-Kaempfe | Dec. 19, 1916 |
| 1,887,773 | McLauglin | Nov. 15, 1932 |
| 1,919,332 | Jones | July 25, 1933 |
| 1,901,567 | Rogatz | Mar. 14, 1933 |
| 1,610,625 | Smith | Dec. 14, 1926 |
| Re. 19,039 | Wilde | Jan. 2, 1934 |
| 1,928,971 | Dillon | Oct. 3, 1933 |
| 2,338,028 | Doll | Dec. 28, 1943 |
| 2,202,452 | Hildebrand | May 28, 1940 |